A. C. FRANK.
SOOT TRAP.
APPLICATION FILED APR. 28, 1917.

1,290,961.

Patented Jan. 14, 1919.

INVENTOR.
A.C. Frank.
BY
Carlos P. Griffin
ATTORNEY.

UNITED STATES PATENT OFFICE.

AUGUST C. FRANK, OF HAYWARD, CALIFORNIA.

SOOT-TRAP.

1,290,961.  Specification of Letters Patent.  Patented Jan. 14, 1919.

Application filed April 28, 1917. Serial No. 165,269.

*To all whom it may concern:*

Be it known that I, AUGUST C. FRANK, a citizen of the United States, residing at Hayward in the county of Alameda, State of California, have invented a new and useful Soot-Trap of which the following is a specification, in such full and clear terms as will enable those skilled in the art to construct and use the same.

This invention relates to a dust trap for use with a common form of vacuum cleaner in cleaning stoves, and other places where it is necessary, to prevent the dust and dirt or soot accumulated from coming into contact with the vacuum cleaner.

An object of the invention is to provide a trap which can be readily cleaned, and which will retain all of the dirt therein, thereby making it possible to empty the trap without soiling the vacuum cleaner or scattering the dirt from place to place.

It will be understood that the common forms of household vacuum cleaners have a dust collecting bag which must be emptied when a certain quantity of dust has been collected therein, but that, in cleaning a stove, a quantity of very light and dirty soot is always encountered, which soot would be very dirty to handle if it escaped into the vacuum cleaner, and was detained by the ordinary dust bag, so that this invention provides means whereby this soot will be sufficiently broken up and detained in a pot of water in such a way as to prevent it from escaping into the cleaning bag and vacuum cleaner, thereby preventing the vacuum cleaner from being soiled with a mass of light black soot.

Another object of the invention is to provide a depending hood which will prevent the splashing of the water in the trap from striking the final air filter and thereby soiling it.

Another object of the invention is to produce a series of removable baffle plates with a surrounding wall which will enable the air escaping in the water to filter up slowly through the baffle plates while at the same time not interfering with the complete circulation of the water therein in such a way as to direct all splash to the under side of the protecting hood for the air filter.

Other objects of the invention will appear as the description proceeds.

An embodiment of the invention is shown in the drawings in which the same reference numeral is applied to the same portion throughout, but I am aware that there may be modifications thereof.

Figure 1:
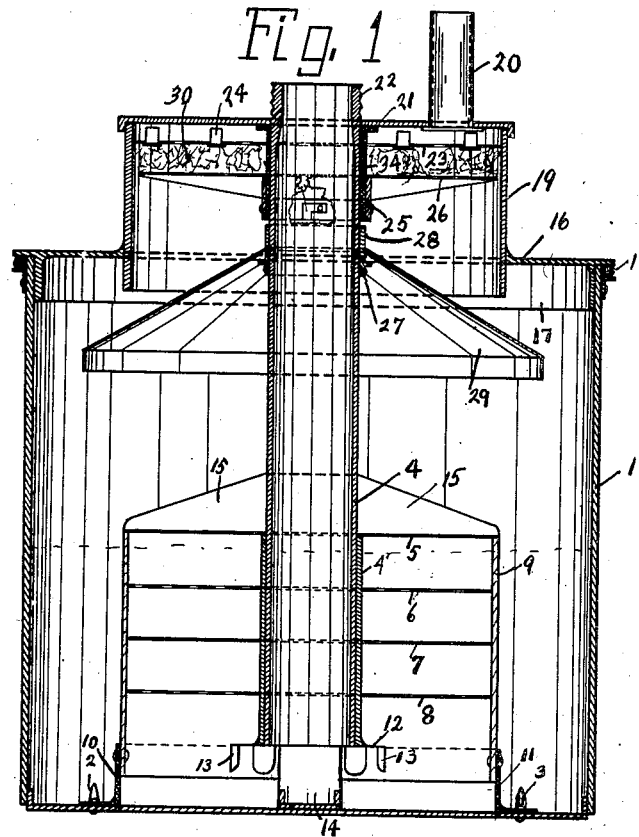
Figure 1 is a vertical sectional view through the trap.
Figure 2:
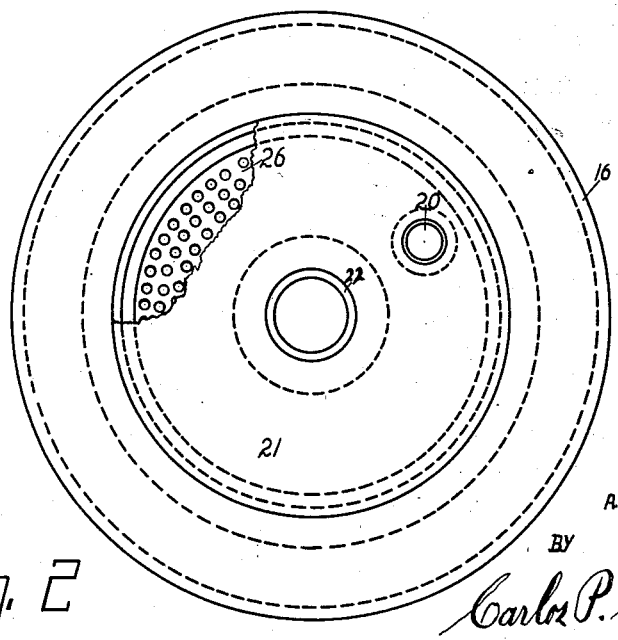
Fig. 2 is a plan view of the trap with a portion of the cover broken away for the purpose of illustration.

The numeral 1 indicates a suitable receptacle ordinarily made of galvanized iron, and of a capacity of about three to five gallons. The receptacle 1 has pins 2 and 3 projecting from the bottom thereof to hold the dust collecting apparatus in the proper position.

The baffle plates 6, 7 and 8 are mounted on a suitable tube 4' which is slidable on the tube 4, and which latter tube extends through the top 21.

The baffle plates are perforated and extend horizontally from the tube 4' to a cylindrical shell 9 surrounding them. Secured to the tube 4 is another horizontal perforated baffle plate 5 which is held horizontally by means of the ribs 15.

The cylindrical shell 9 is held up from the bottom of the receptacle 1 by means of the legs 10 and 11, which loosely fit over the pins 2 and 3. At the bottom of the tube there is a horizontally extending hood 12, which has a series of depending lugs 13, and a handle or rest 14 secured to the tube 4' and on which the tube and attached parts rest in the bottom of the receptacle 1.

The cylindrical shell being spaced away from the outer shell of the water receptacle causes a continuous circulation of the water when the vacuum cleaner is in operation, and thereby more effectively detains the soot particles which are of a nature to resist moistening.

A plurality of ribs 15 serve to hold the screens rigid under the influence of the vacuum produced. The receptacle 1 has a cover formed of a flat ring 16 which has a depending flange 17 extending into the receptacle 1, while a gasket 18 serves to make an air tight joint between the receptacle and cover. The raised hood 19 is secured to the center of the cover, and it has a pipe 20 to which the suction pipe of a vacuum cleaner is connected. The tube 4 extends through the top 21, and it is threaded at its upper end as indicated at 22 for the purpose of connecting with the tube to be used in picking up the soot or dust.

Secured within the hood 19, and at a short distance therefrom is a foraminous plate 23 which is separated from the top by means of suitable pins or lugs 24 to permit the air to pass to the pipe 20.

Slidable on a tube 34 is a collar 25 which carries a circular foraminous plate 26. The tube 34 is connected with the top 21 and the tube 4 passes therethrough and makes a close joint therewith, the collar 25 has two inwardly extending pins 25' which take in notches of the tube 34 to hold the screen 26 up. The tube 4 has a collar 27 rigidly secured thereto for the support of a collar 28 which carries a conical depending hood 29.

The object of the hood 29 is to prevent any water spray or dust particles which cannot be detained by the water from passing directly into the dust bag of the vacuum cleaner. A suitable fibrous substance such as cotton or asbestos is placed between the plates 23 and 26 as indicated at 30 for the purpose of detaining any dust that may pass over the hood 29.

The collar 34, ring 28 and tube 4' frictionally engage the tube 4 with sufficient force to hold them in the desired positions, while at the same time the tube 4 may be easily removed therefrom, and the depending flange 17 frictionally engages the outer walls of the receptacle 1 with sufficient force to hold the top in place.

In operation, the suction pipe of the vacuum cleaner is connected with the pipe 20. A suitable pipe is then connected with the pipe 22, and that pipe is used to pick up the soot and dirt in the stove or other place, and as a quantity of water is maintained in the receptacle 1, as indicated by the dotted lines, the dirt must pass out into the water, and the screens prevent light particles from coming to the top until they have been well broken up and thoroughly wet.

When the trap is to be cleaned, the top and parts connected therewith are removed from the receptacle 1 by lifting them out of it. The screens 6 to 8 may thereupon be slipped off the tube 4 by pushing on the handle 14, the tube 4' engaging the tube 4 and handle tight enough to hold it in the desired position. The top 21 may then be disengaged from the tube 4 by slipping said tube out of the collar 21 which it frictionally engages only tight enough to hold it in the desired position; thereupon the hood 29 and ring 28 may be slipped off the tube 4, said ring 28 frictionally engaging the tube and resting upon the fixed collar 27. When the tube has been removed from the top, the screen 26 and collar 25 may be taken off the collar 21 by turning the collar 25 slightly so that the pin 25' is disengaged from the slot in the collar 21.

Having thus described my invention, what I claim as new and desire to secure by Letters Patent of the United States, is as follows, express reservation being made of permissible modifications:

1. A dust trap for vacuum cleaners comprising a casing, a plurality of foraminous baffle plates carried by a removable cylindrical shell, a depending removable conical hood carried by the inlet pipe, and a foraminous dust collecting partition at the top of the trap above the conical shell.

2. A dust trap for vacuum cleaners comprising a water receptacle, a removable cover therefor, inlet and outlet pipes extending through the cover, a plurality of depending baffle plates at the bottom of the inlet pipe, a support for the inlet pipe and parts connected therewith, a plurality of foraminous baffle plates adjacent the lower end of the inlet pipe in the water receptacle, an open cylindrical shell extending nearly to the bottom of the water receptacle and surrounding the foraminous baffle plates, a depending conical hood removably connected with the inlet pipe above the baffle plates, and a pair of spaced foraminous plates in the top of the cover for the support of a filtering medium.

3. A dust trap for vacuum cleaners comprising a water receptacle, a removable cover therefor having a compartment smaller in diameter than the cover and extending above the water receptacle, inlet and outlet pipes connected with the cover, a plurality of substantially horizontally extending foraminous baffle plates adjacent the lower end of the inlet pipe, a cylindrical shell surrounding said foraminous baffle plates, a plurality of brackets adapted to hold said cylindrical shell above the bottom of the water receptacle, a hood carried by the inlet pipe and of greater diameter than the compartment formed in the water receptacle cover, and a pair of foraminous plates in the covering compartment for holding the dust collecting material, all of the foraminous plates and the hood being detachable from the inlet pipe at will for the purpose of cleaning.

In testimony whereof I have hereunto set my hand this 25th day of April, A. D. 1917.

AUGUST C. FRANK.